(12) United States Patent
Ranka et al.

(10) Patent No.: US 10,160,393 B2
(45) Date of Patent: Dec. 25, 2018

(54) VEHICLE ARTICLE CARRIER SYSTEM HAVING STRETCH RAILS WITH STOWABLE CROSS BARS

(71) Applicant: JAC Products, Inc., Saline, MI (US)

(72) Inventors: Noel V. Ranka, Canton, MI (US); Jeffrey M. Aftanas, Ortonville, MI (US); Gordon Michie, LaSalle (CA); Michael J. Presley, Plymouth, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 15/839,147

(22) Filed: Dec. 12, 2017

(65) Prior Publication Data

US 2018/0162287 A1 Jun. 14, 2018

Related U.S. Application Data

(60) Provisional application No. 62/433,630, filed on Dec. 13, 2016.

(51) Int. Cl.
*B60R 9/045* (2006.01)

(52) U.S. Cl.
CPC .................................... *B60R 9/045* (2013.01)

(58) Field of Classification Search
CPC ..................................................... B60R 9/045
USPC ........................................................ 224/321
See application file for complete search history.

(56) References Cited

U.S. PATENT DOCUMENTS

| | | |
|---|---|---|
| 3,165,353 A | 1/1965 | Weise |
| 3,670,935 A | 6/1972 | Hinkston |
| 3,838,802 A | 10/1974 | Grycel, III |
| 4,132,335 A | 1/1979 | Ingram |
| 4,225,068 A | 9/1980 | Ingram |
| 4,239,138 A | 12/1980 | Kowalski |
| 4,295,587 A | 10/1981 | Bott |
| 4,345,705 A | 8/1982 | Graber |
| 4,406,386 A | 9/1983 | Rasor et al. |
| 4,416,406 A | 11/1983 | Popeney |
| 4,469,261 A | 9/1984 | Stapleton et al. |
| 4,473,178 A | 9/1984 | Bott |
| 4,487,348 A | 12/1984 | Mareydt |
| 4,911,348 A | 3/1990 | Rasor et al. |
| 5,004,139 A | 4/1991 | Storm et al. |
| 5,071,050 A | 12/1991 | Pudney et al. |
| 5,104,018 A | 4/1992 | Dixon et al. |
| 5,143,267 A | 9/1992 | Cucheran et al. |

(Continued)

FOREIGN PATENT DOCUMENTS

| | | |
|---|---|---|
| DE | 2939672 | 4/1981 |
| DE | 2945950 | 5/1981 |

(Continued)

*Primary Examiner* — Justin Larson
(74) *Attorney, Agent, or Firm* — Harness, Dickey & Pierce, P.L.C.

(57) ABSTRACT

The present disclosure relates to a vehicle article carrier apparatus for securing articles above an outer body surface of a vehicle. The apparatus may make use of a pair of low profile support rails fixedly secured generally parallel to one another on the outer body surface. A pair of cross bars may be configured to be coupled to the support rails in a stowed orientation extending parallel to the support rails, so as to be generally not visible from a side of the vehicle, and an operative orientation extending perpendicularly between the support rails and elevationally above the support rails for supporting articles thereon.

20 Claims, 13 Drawing Sheets

(56) References Cited

U.S. PATENT DOCUMENTS

| | | |
|---|---|---|
| 5,170,920 A | 12/1992 | Corrente et al. |
| 5,273,195 A | 12/1993 | Cucheran |
| 5,340,007 A | 8/1994 | Jeuffray et al. |
| 5,372,287 A | 12/1994 | Deguevara |
| 5,377,890 A | 1/1995 | Brunner et al. |
| 5,385,285 A | 1/1995 | Cucheran et al. |
| 5,395,024 A | 3/1995 | Luchtenberg et al. |
| 5,411,196 A | 5/1995 | Lee, Jr. et al. |
| 5,464,140 A | 11/1995 | Hill |
| 5,470,003 A | 11/1995 | Cucheran |
| 5,511,709 A | 4/1996 | Fisch |
| 5,529,231 A | 6/1996 | Burgess |
| 5,549,229 A | 8/1996 | Grabowski |
| 5,577,649 A | 11/1996 | Lee, Jr. et al. |
| 5,588,572 A | 12/1996 | Cronce et al. |
| 5,624,063 A | 4/1997 | Ireland |
| 5,732,864 A | 3/1998 | Stapleton |
| 5,758,810 A | 6/1998 | Stapleton |
| 5,782,391 A | 7/1998 | Cretcher |
| 5,791,536 A | 8/1998 | Stapleton |
| 5,826,766 A | 10/1998 | Aftanas |
| 5,845,828 A | 12/1998 | Settelmayer |
| 5,845,829 A | 12/1998 | Stapleton |
| 5,884,824 A | 3/1999 | Spring, Jr. |
| 5,919,465 A | 7/1999 | Daynes et al. |
| 6,010,048 A | 1/2000 | Settelmayer |
| 6,015,074 A | 1/2000 | Snavely et al. |
| 6,102,265 A | 8/2000 | Stapleton |
| 6,286,739 B1 | 9/2001 | Stapleton |
| 6,409,063 B1 | 6/2002 | Kmita et al. |
| 6,415,970 B1 | 7/2002 | Kmita et al. |
| 6,467,663 B1 | 10/2002 | Kmita et al. |
| 6,722,541 B1 | 4/2004 | Aftanas et al. |
| 6,811,066 B2 | 11/2004 | Aftanas et al. |
| 6,959,845 B2 | 11/2005 | Aftanas et al. |
| 7,066,364 B2 | 6/2006 | Kmita et al. |
| 7,090,103 B2 | 8/2006 | Aftanas et al. |
| 7,448,523 B2 | 11/2008 | Aftanas et al. |
| 8,028,875 B2 | 10/2011 | Kmita et al. |
| 8,096,454 B2 | 1/2012 | Aftanas et al. |
| 8,235,264 B2 | 8/2012 | Aftanas et al. |
| 8,251,267 B2 | 8/2012 | Aftanas et al. |
| 8,348,111 B2 | 1/2013 | Heuchert et al. |
| 8,393,507 B2 | 3/2013 | Aftanas |
| 8,528,799 B2 | 9/2013 | Michie et al. |
| 2009/0321485 A1 | 12/2009 | Jamieson et al. |
| 2010/0252595 A1 | 10/2010 | Heuchert et al. |

FOREIGN PATENT DOCUMENTS

| | | |
|---|---|---|
| DE | 3029586 | 3/1982 |
| DE | 3201409 | 9/1983 |
| DE | 3641745 | 6/1988 |
| DE | 3814799 | 11/1988 |
| DE | 29504783 U1 | 5/1995 |
| EP | 1470960 A1 | 10/2004 |
| EP | 1728686 A2 | 12/2006 |
| FR | 2661378 | 10/1991 |
| FR | 2699475 | 6/1994 |
| FR | 2713568 | 6/1995 |
| FR | 2828854 A1 | 2/2003 |
| GB | 2381252 | 4/2003 |
| JP | 07228198 | 8/1995 |
| JP | 11034751 | 2/1999 |
| WO | 9108929 | 6/1991 |

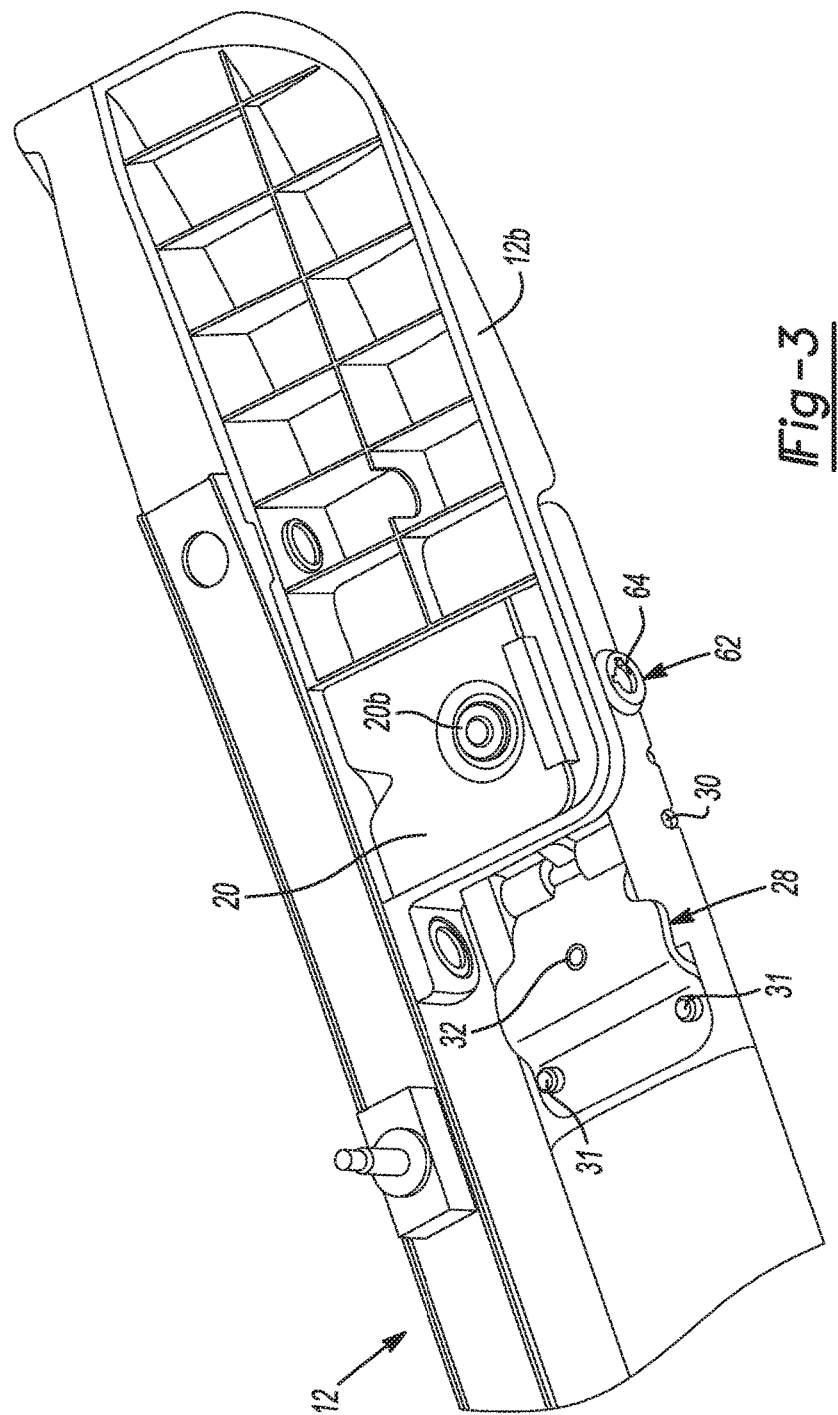

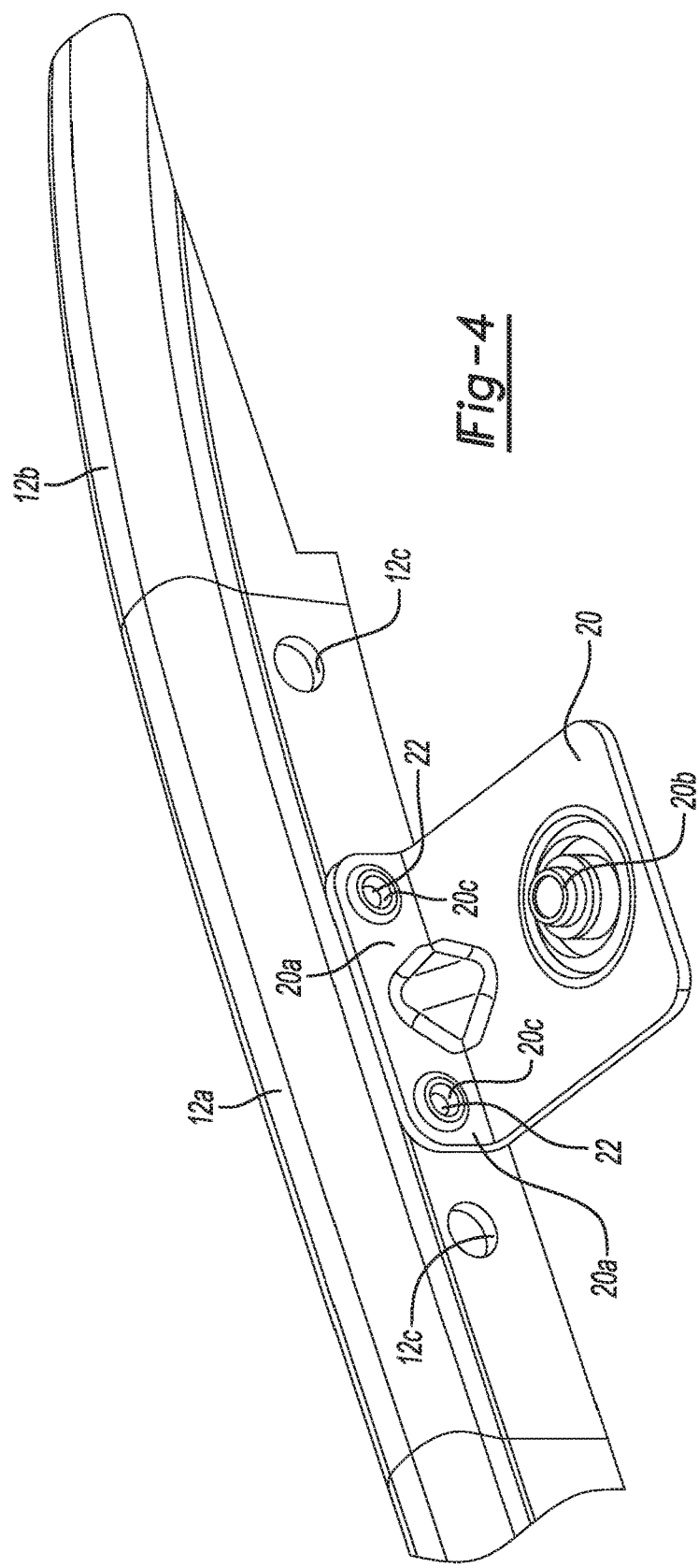

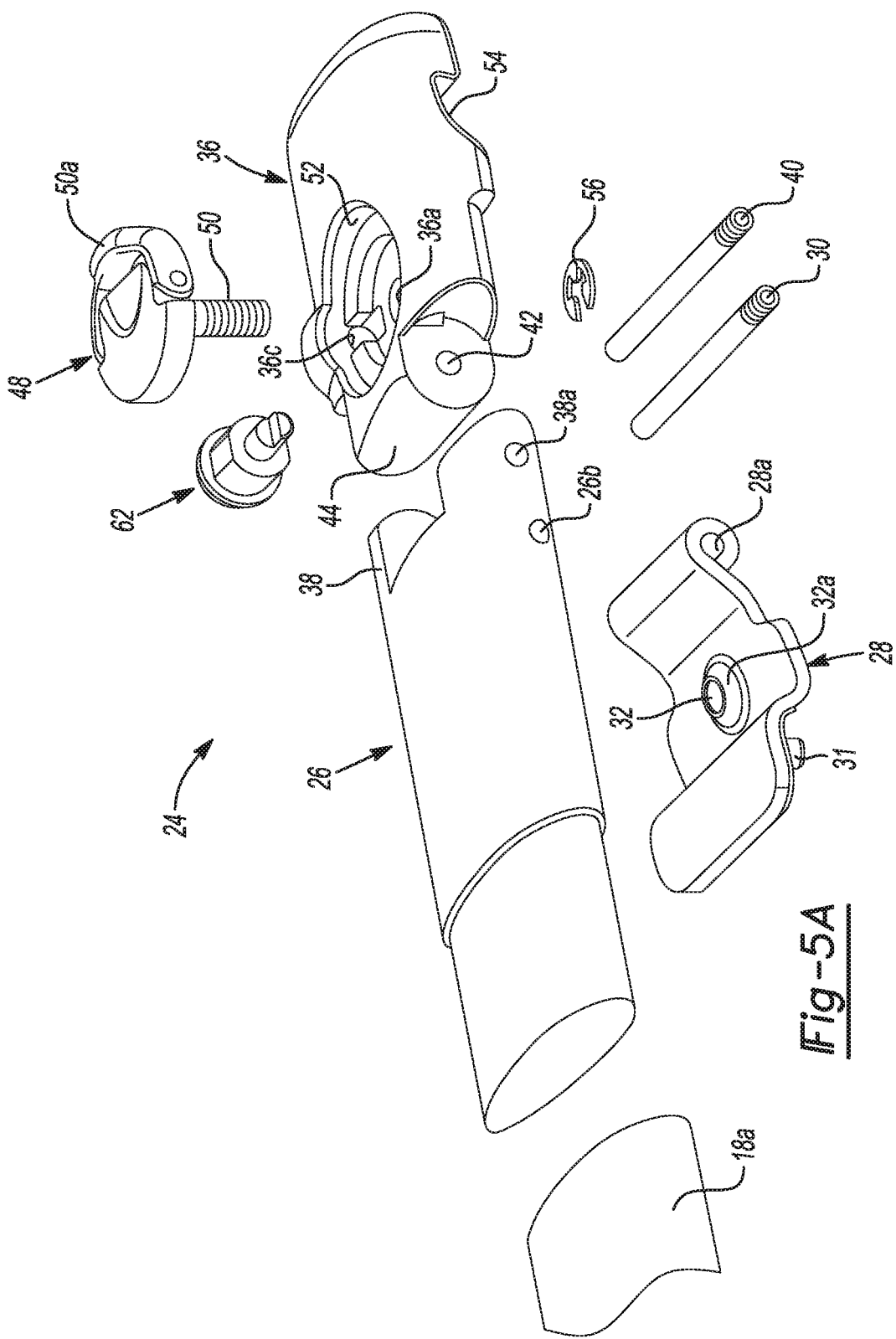

VEHICLE ARTICLE CARRIER SYSTEM HAVING STRETCH RAILS WITH STOWABLE CROSS BARS

CROSS-REFERENCE TO RELATED APPLICATIONS

This application claims the benefit of U.S. Provisional Application No. 62/433,630, filed on Dec. 13, 2016. The entire disclosure of the above application is incorporated herein by reference.

FIELD

The present disclosure relates to vehicle article carrier systems, and more particularly to a vehicle article carrier system employing a pair of stretch rails which have provisions for mounting a pair of cross bars in a stowed configuration, substantially hidden from view, when standing alongside a vehicle on which the article carrier system is employed.

BACKGROUND

The statements in this section merely provide background information related to the present disclosure and may not constitute prior art.

Vehicle article carrier systems that enable a pair of cross bars to be held in a stowed orientation when not needed for use, have enjoyed significant popularity in recent years. The assignee of the present disclosure is a leader in the manufacture of vehicle article carrier systems, and owns a number of U.S. patents directed to vehicle article carriers having stowable cross bars, namely: U.S. Pat. Nos. 8,096,454; 8,251,267; 6,811,066; 7,066,364; 7,090,103; 7,448,523; and 8,028,875, all of which are hereby incorporated by reference into the present application.

In certain regions, for example Europe, vehicle article carriers employing support rails which stretch along substantially an entire length of a roof of the vehicle, and which are known in the industry as "stretch bent rails", are popular from an aesthetic standpoint. Typically two cross bars are then attached to a parallel pair of roof mounted stretch bent rails to enable articles to be supported above the roof of the vehicle. Stretch bent rails also provide a relatively low profile, and maintaining the low profile of the stretch rails is a highly desirable feature, both from an aesthetic standpoint and an aerodynamic standpoint.

When using stretch bent rails, there is a preference by some vehicle manufacturers that the end supports at opposite ends of the cross bars are able to be clamped onto portions of the stretch rails. However, configuring each of the end supports with a moveable jaw would typically result in an end support which is somewhat thicker than would be desired, and more difficult to hold in a stowed orientation while still being hidden from view when standing alongside the vehicle.

SUMMARY

This section provides a general summary of the disclosure, and is not a comprehensive disclosure of its full scope or all of its features.

In one aspect the present disclosure relates to a vehicle article carrier apparatus for securing articles above an outer body surface of a vehicle. The apparatus may comprise a pair of low profile support rails fixedly secured generally parallel to one another on the outer body surface. A pair of cross bars may be configured to be coupled to the support rails in a stowed orientation extending parallel to the support rails, so as to be generally not visible from a side of the vehicle, and an operative orientation extending perpendicularly between the support rails and elevationally above the support rails for supporting articles thereon. Each cross bar may include a pair of end supports for securing the cross bar to the support rails. Each end support may include including a neck portion, a support element pivotally secured to the neck portion, and a clamp element pivotally secured to the neck portion for assisting in clamping its associated end support onto one of the support trails when its associated cross bar is in the operative position. The clamp element may further be held in a retracted position generally co-linear with the support element when the support element is positioned generally co-linear with the neck portion, and held in a recessed portion of the neck portion, to facilitate attachment of the end support to one of the support rails when being secured in the stowed orientation. A fastening assembly may be included which is carried by the support element for securing the clamp element in clamping engagement with its associated support rail when the associated support rail is in its operative orientation.

In another aspect the present disclosure relates to a vehicle article carrier apparatus for securing articles above an outer body surface of a vehicle. The apparatus may comprise first and second low profile support rails fixedly secured generally parallel to one another on the outer body surface. A first pair of brackets may be disposed adjacent an inboard side of the first support rail at opposite ends of the first support rail. A second pair of brackets may be disposed adjacent an inboard side of the second support rail at, opposite ends of the second support rail. A pair of cross bars are configured to be coupled to the pairs of brackets when the cross bars are each disposed in a stowed orientation extending parallel to the support rails, so as to be generally not visible from a side of the vehicle. The cross bars are positionable in an operative orientation extending perpendicularly between the support rails and elevationally above the support rails for supporting articles thereon. Each cross bar may include a pair of end supports for securing the cross bar to the support rails, and each may include a neck portion, a support element pivotally secured to the neck portion, and a clamp element pivotally secured to the neck portion. The clamp element may be for assisting in clamping its associated end support onto one of the support trails when its associated cross bar is in the operative position. A fastening assembly is carried by the support element for securing the clamp element in clamping engagement with its associated support rail when the associated support rail is in its operative orientation. The support element is configurable to extend co-linearly with the support element when its associated cross is placed in a stowed orientation, and to extend non-parallel to the neck portion when its associated cross bar is placed in the operative orientation to place the cross bar in an elevated position above the support rails.

In still another aspect the present disclosure relates to a vehicle article carrier apparatus for securing articles above an outer body surface of a vehicle. The apparatus may comprise first and second low profile support rails fixedly secured generally parallel to one another on the outer body surface, each of the support rails including two pairs of holes on inboard sides thereof. A first pair of brackets may be included which are disposed adjacent an inboard side of the first support rail at opposite ends of the first support rail. A second pair of brackets may also be included which are disposed adjacent an inboard side of the second support rail at opposite ends of the second support rail. A pair of cross bars is included which are each configured to be coupled to the pairs of brackets when the cross bars are each disposed in a stowed orientation extending parallel to the support rails, so as to be generally not visible from a side of the vehicle. The cross bars are further positionable in an operative orientation extending perpendicularly between the support rails and elevationally above the support rails for supporting articles thereon. Each cross bar may include a pair of end supports for securing the cross bar to the support rails. Each end support may include a neck portion, a support element pivotally secured to the neck portion, and a clamp element pivotally secured to the neck portion. The clamp element may be used to assist in clamping its associated end support onto one of the support trails when its associated cross bar is in the operative position. The clamp element may have a threaded opening and a boss portion. A fastening assembly may also be included which has a threaded shaft and is carried by the support element for securing the clamp element in clamping engagement with its associated support rail. The engagement may be by engagement of the threaded shaft and the threaded opening when the associated support rail is in its operative orientation. The boss portion of the clamping element may further engage with at least one of the holes on one of the support rails when the cross bar is secured in the operative orientation. The support element may be configurable to extend co-linearly with the neck portion when its associated cross bar is placed in a stowed orientation, and to extend non-parallel to the neck portion when its associated cross bar is placed in the operative orientation to place the cross bar in an elevated position above the support rails.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a perspective view of an undersurface of one of the stretch bent rails with a portion of one of the cross bar assemblies shown secured thereto;

FIG. 4 is a perspective view of a portion of one of the stretch bent rails illustrating a bracket to which one end of one of the cross bar assemblies may be secured when the cross bar assembly is secured in its stowed orientation;

FIG. 5A is an exploded top perspective view of the components of one of the end support assemblies of one of the cross bar assemblies;

DETAILED DESCRIPTION

Figure 1:
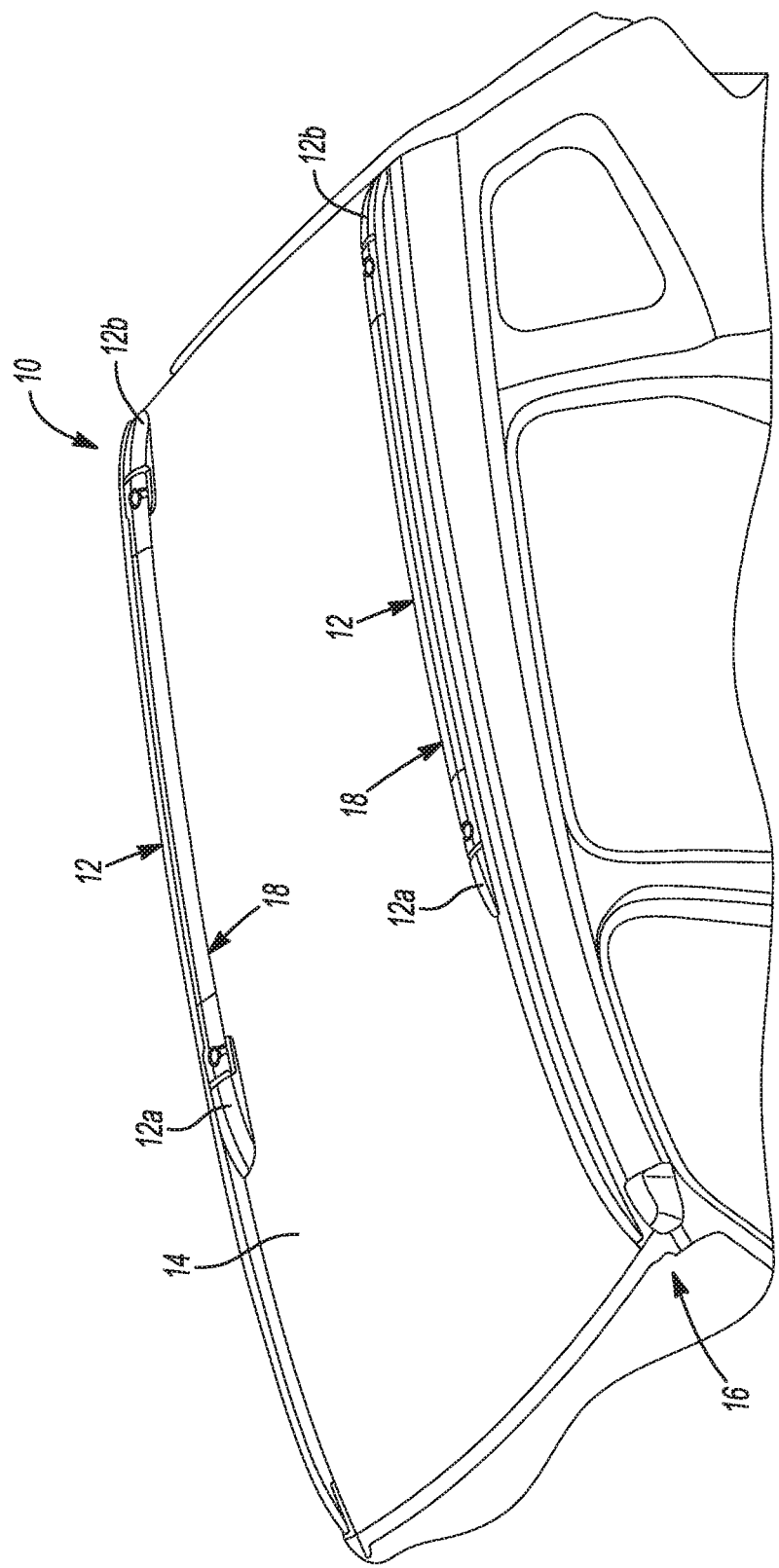
FIG. 1 is a perspective view of one embodiment of a vehicle article carrier system in accordance with the present disclosure, with a pair of cross bar assemblies disposed in stowed positions on a pair of stretch bent rails.

The following description is merely exemplary in nature and is not intended to limit the present disclosure, application, or uses. It should be understood that throughout the drawings, corresponding reference numerals indicate like or corresponding parts and features.

Referring to FIG. 1 a vehicle article carrier system 10 (hereinafter simply "system 10") is shown in accordance with one embodiment of the present disclosure. The system 10 includes a pair of support rails 12 which are commonly referred to as "stretch bent rails" in the industry because they run substantially the full length of a vehicle roof surface and have a profile that conforms to the contour of the roof surface. The stretch bent rails 12 are fixedly secured to a roof surface 14 of a vehicle 16 so that they extend generally parallel to one another. A pair of cross bar assemblies 18 are each secured to a leading edge mounting portion 12a and rearward mounting portion 12b of one of the stretch bent rails when being held in a stowed position, as shown in FIG. 1. When held in their stowed positions, the cross bar assemblies 18 are virtually entirely hidden from view when standing alongside the vehicle 16. This also allows the system 10 to maintain a highly aesthetic and aerodynamically efficient low profile.

Figure 2:
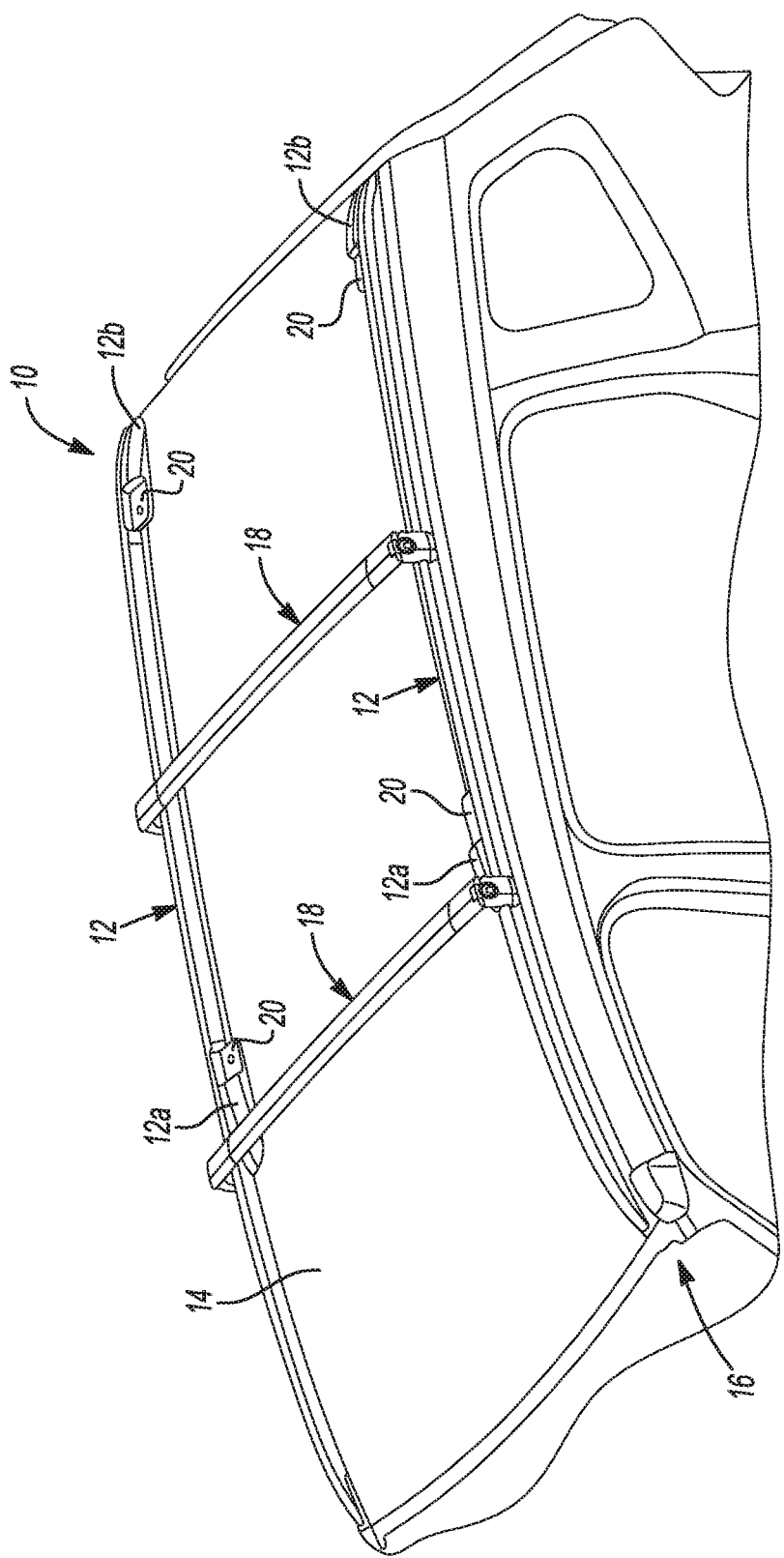
FIG. 2 is a perspective view of the system of FIG. 1 but with the pair of cross bar assemblies disposed in their operative positions clamped onto the stretch bent rails.

FIG. 2 illustrates the system 10 with the cross bar assemblies 18 in their deployed positions. As will be described further in the following paragraphs, the cross bar assemblies 18 are clamped over portions of the stretch bent rails 12 and include portions with engage within holes (not visible in FIG. 2) in the stretch bent rails 12.

Figure 14:
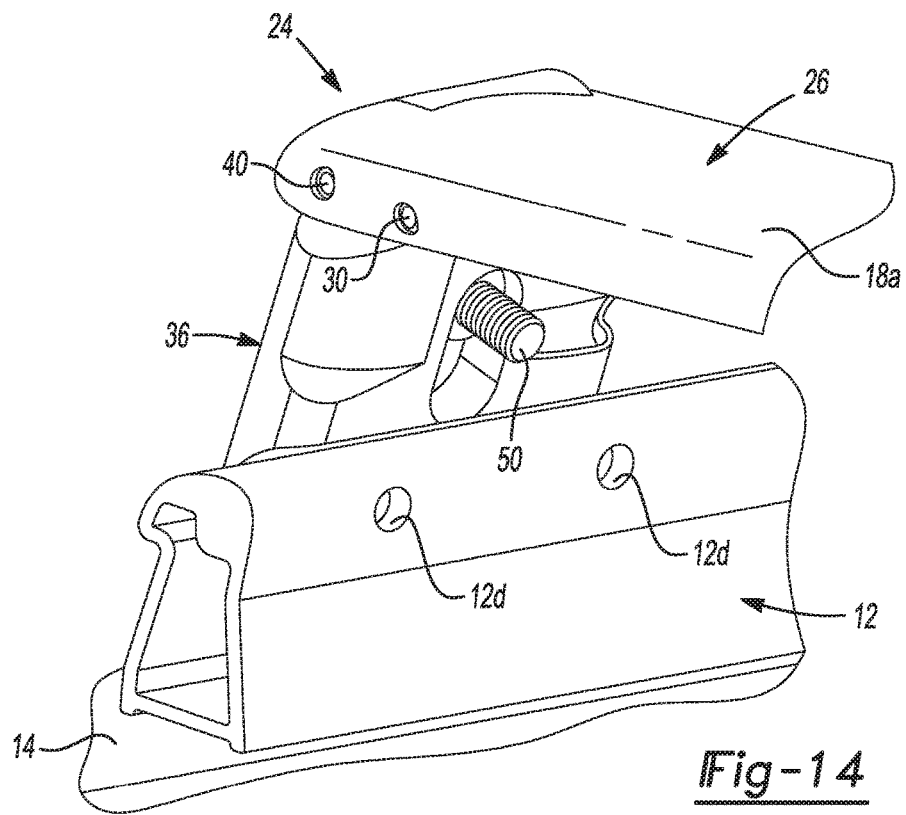
FIG. 14 shows one of the pairs of holes at one distal end of one of the stretch bent rails where the clamp element of the end support assembly engages.

Referring to FIGS. 3, 4 and 14, the construction of one of the stretch bent rails 12 is shown in greater detail. In FIGS. 3 and 4 specifically, each stretch bent rail 12 includes a bracket 20 having a shoulder portion 20a with a pair of openings 20c which is fixedly secured to an associated stretch bent rail 12 via fastening elements (e.g., threaded fasteners) 22. The bracket 20 also includes a threaded opening 20b for securing one end of one of the cross bar assemblies thereto. Each stretch bent rail 12 also includes a plurality of holes 12c at spaced apart locations where a decorative cover (not shown shown) may be secured to the stretch bent rail to substantially (but not fully) cover the bracket 20. In FIG. 14, each stretch bent rail 12 can be seen to include a first pair of holes 12d near one distal end, and a second pair of identical holes 12d at the opposite distal end (the second pair not being visible in FIG. 14) and all pairs of holes 12d being on inboard sides of the support rails. One pair of the holes 12d at a first distal end of the stretch bent rails 12 is used when one of the cross bar assemblies 18 is secured in its operative position extending perpendicularly between the stretch bent rails at the first distal end of the rails, and the other pair of holes is used when the other cross bar assembly 18 is mounted in its operative position between the stretch bent rails at the opposite distal end of the rails.

Figure 5B:
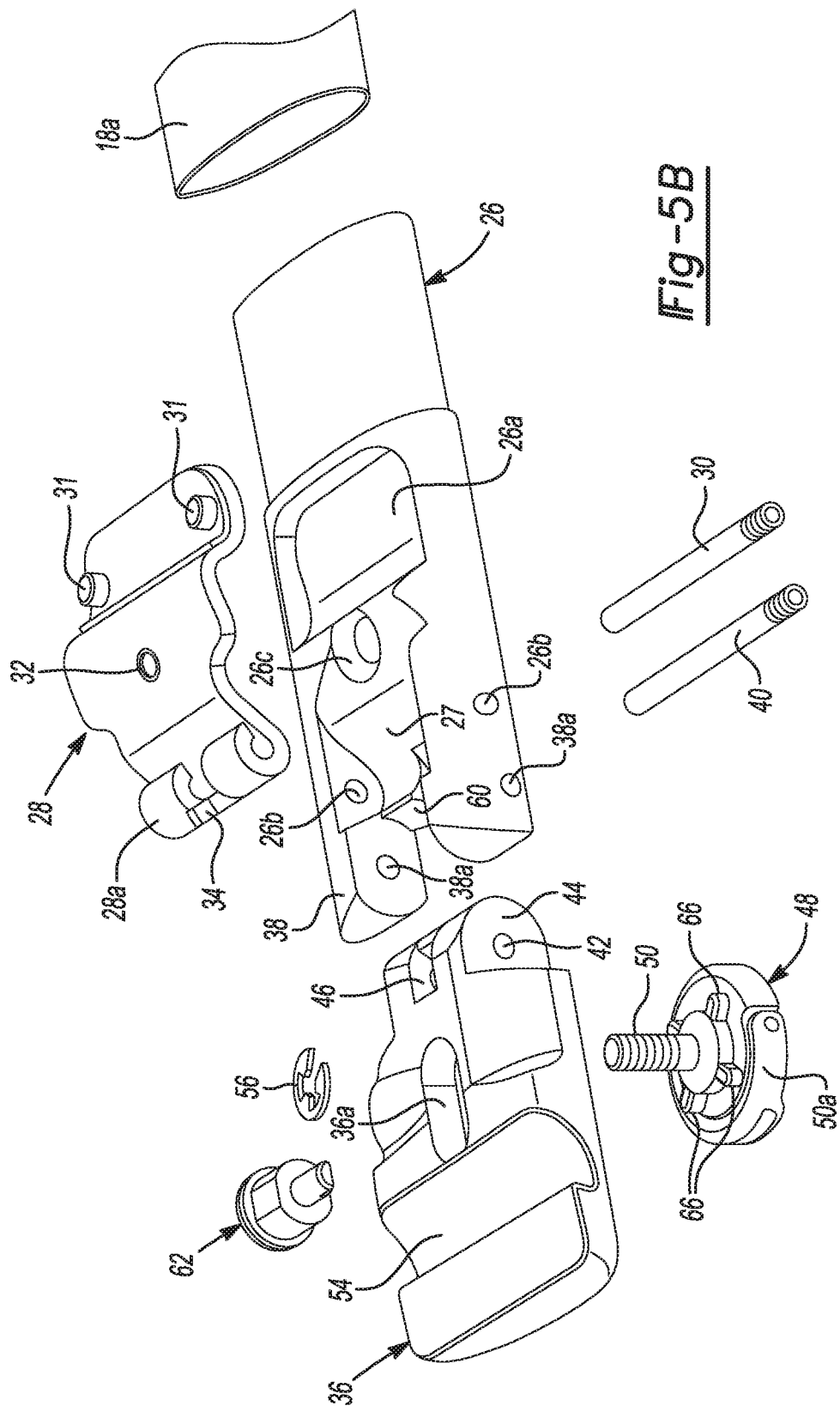
FIG. 5B is an exploded bottom perspective view of the components shown in FIG. 5A.

Referring to FIGS. 5A and 5B, each cross bar assembly 18 includes an end support assembly 24 at its opposing ends. The end support assemblies 24 in this example are identical in construction, although they need not be perfectly identical in construction. Each end support assembly 24 includes a neck portion 26 with a pivotally supported clamp element 28. The neck portion 26 may be telescopically, fixedly engaged with a distal end of a central tubular portion 18a of the cross bar assembly 18, for example by suitable threaded fastening elements (not shown). The neck portion 26 includes a recessed portion 26a which is formed generally in accordance with the clamp element 28 so that the clamp element can be substantially housed therein when the cross bar is positioned in its stowed orientation on one of the stretch bent rails 12. A pivot pin 30 extends through a hole 28a in a rolled end portion 28b of the clamp element 28, and through a hole 26b in the neck portion 26 to support one end of the clamp element for pivotal movement relative to the neck portion 26. The clamp element 28 also includes a pair of boss portions 31, a threaded opening 32 formed in a raised section 32a, and a tab portion 34. A recess 26c in the neck portion accommodates raised section 32a when the clamp element 28 is positioned in its fully stowed position in recessed portion 26a.

Figure 6:
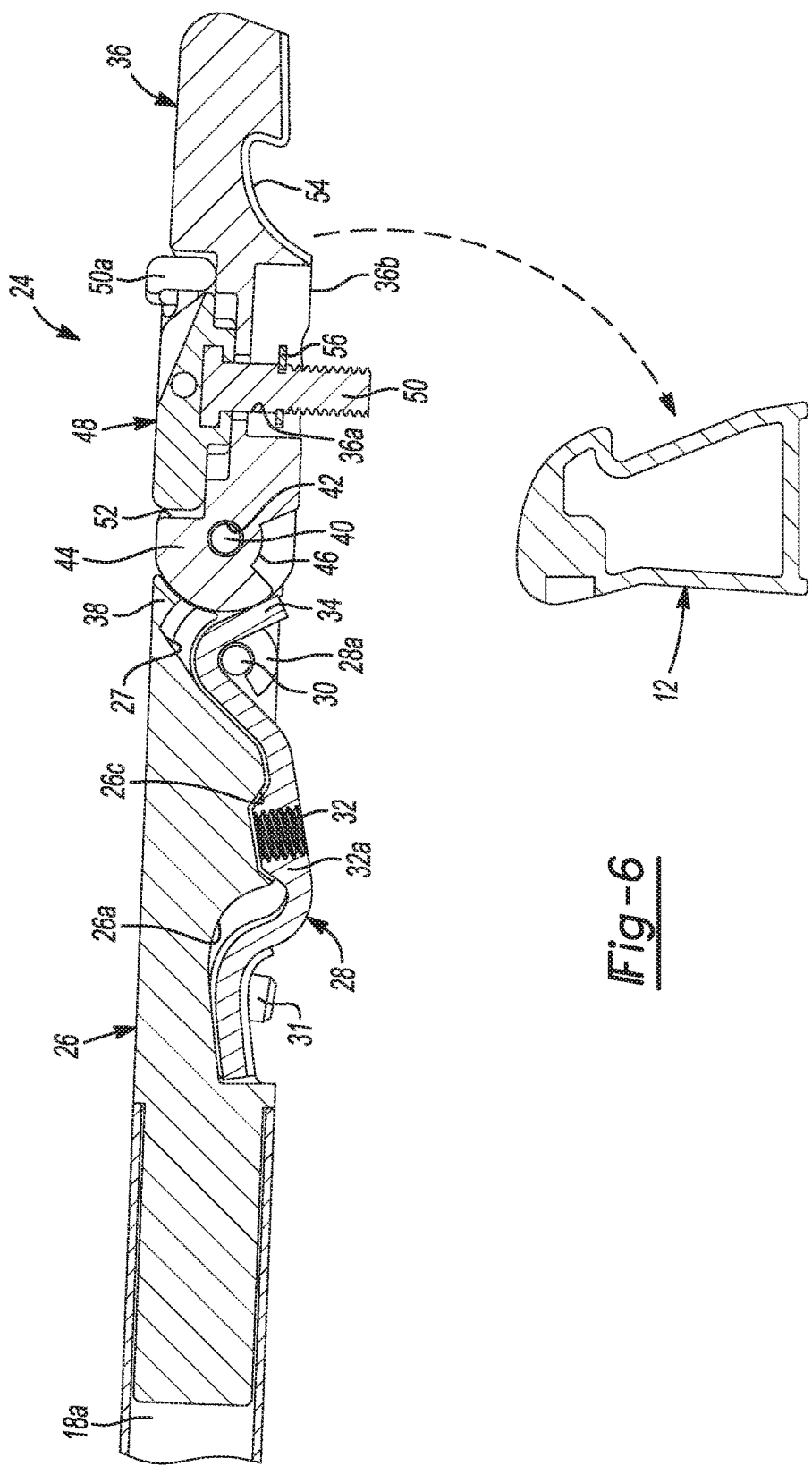
FIG. 6 is a partial side cross sectional view of one of the end support assemblies further illustrating the individual component parts associated therewith.

With further reference to FIGS. 5A, 5B and 6, the end support assembly 24 further includes a support element 36 which is pivotally secured to a clevis-like portion 38 of the neck portion 26 by a pivot pin 40. The pivot pin 40 extends through aligned holes 38a in the clevis-like portion 38 and through a hole 42 in a head portion 44 of the support element 36. The head portion 44 also includes a slot 46 (visible in FIG. 6) which is able to receive the tab portion 34, as will be explained further in the following paragraphs. The head portion 44 engages with the clevis-like portion 38 so that only rotational movement between the neck portion 26 and the support element 36 is possible.

The support element 36 further includes a rotatable fastening assembly 48 with a D-ring member 50a which can be flipped up and grasped with a thumb and index finger to rotate the fastening assembly. The fastening assembly 48 includes a threaded shaft 50 which is able to engage the threaded opening 20b of one of the brackets 20 when the cross bar assembly 18 is placed in its stowed position. The fastening assembly 48 rests partially within a recess 52 in the support element 36 so that it is generally flush with an upper surface of the support element when the D-ring member 50a is closed, as shown in FIG. 6. The threaded shaft 50 may extend through a bore 36a so that the threaded shaft projects from an undersurface 36b of the support element 36. A snap ring 56 may engage a portion of a shaft 58 to retain the fastening assembly 48 to the support element 36.

With further reference to FIG. 6, the clamp element 28 has a length such that it generally aligns over an inner recessed portion 54 when the end support assembly 24 is clamped onto one of the stretch bent rails 12. The contour of the inner recessed portion 54 enables the support element 36 to rest on, and to grab onto, a portion of the stretch bent rail 12.

Figure 7:
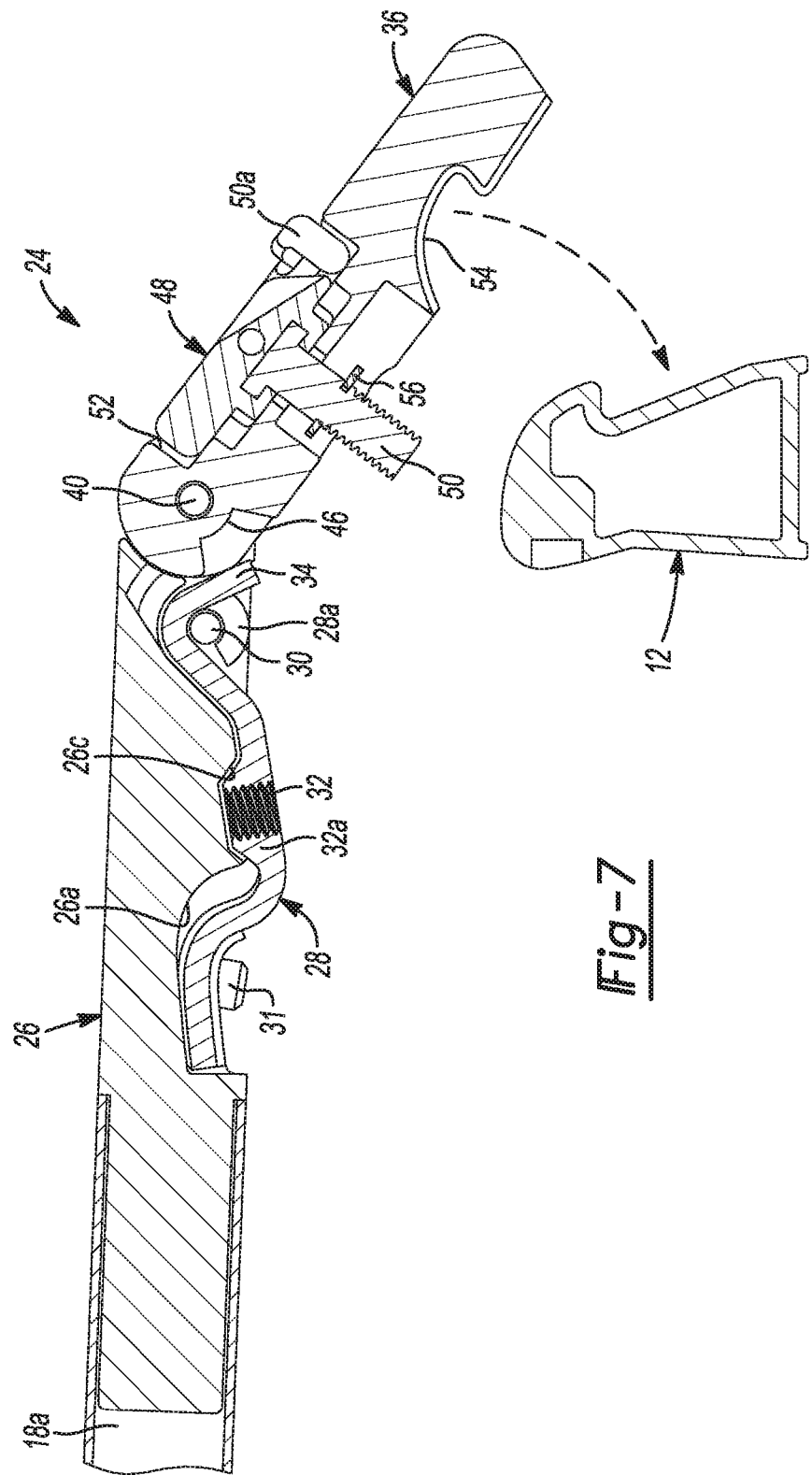
FIG. 7 is a partial side cross sectional view illustrating one of the end support assemblies at a first orientation when a support element of the end support assembly is being moved rotationally into position to engage one of the stretch bent rails.
Figure 8:
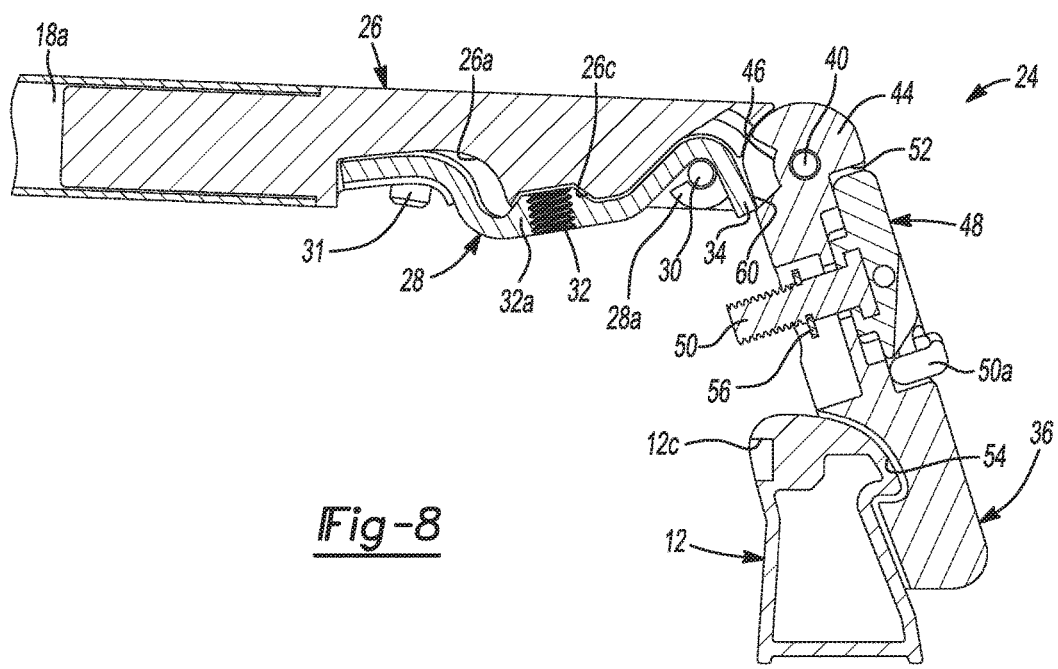
FIG. 8 shows the end support assembly of FIG. 7 positioned on the stretch bent rail.
Figure 9:
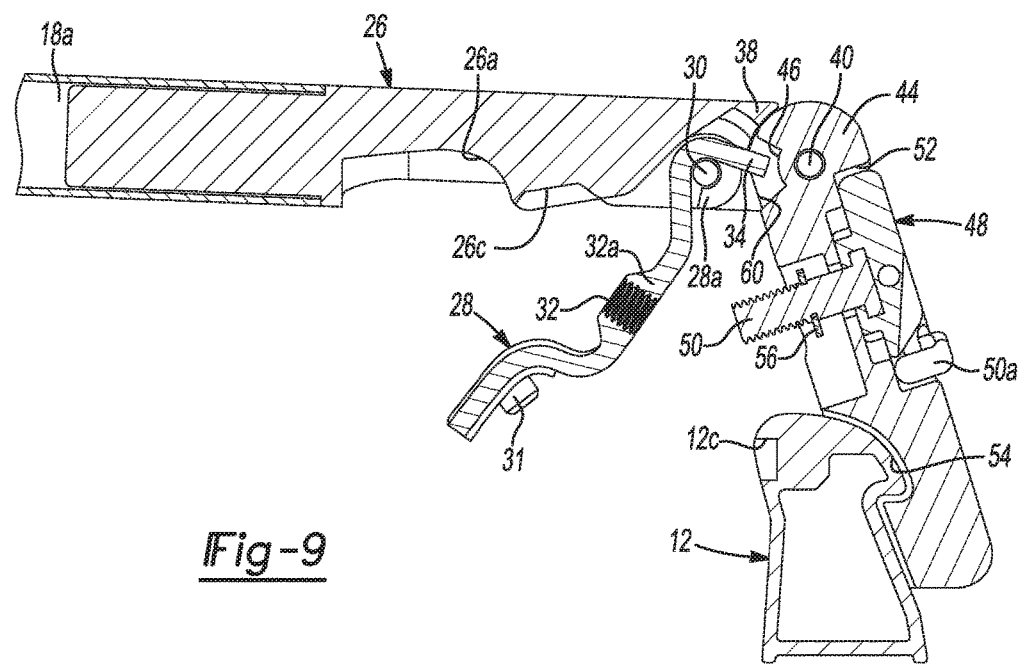
FIG. 9 shows the end support assembly of FIG. 8 with the clamp element being moved into position to engage the threaded shaft of the support element.

Referring to FIG. 7, a first operation in installing the end support assembly 24 assembly of one cross bar assembly 18 in an operative position on one of the stretch bent rails 12 is shown. The support element 36 at the opposite ends of the cross bar assembly 18 has been detached from the brackets 20 by unthreading the fastening assembly 48, and the cross bar assembly 18 has been oriented perpendicular to the stretch bent rails 12, with the end support assembly 24 positioned over one of the stretch bent rails. The angular shape of the tab portion 34 of clamp element 28 permits the support element to be rotated about pivot pin 40 into the orientation show in FIG. 8 where the recessed portion 54 is resting on and engaging the stretch bent rail 12. Once the support element 36 is oriented as shown in FIG. 8, the support element 36 will be abutting surface 60 of the neck portion 26. The tab portion 34 is now able to rotate into the slot 46, and this action is shown in FIG. 9.

Figure 10:
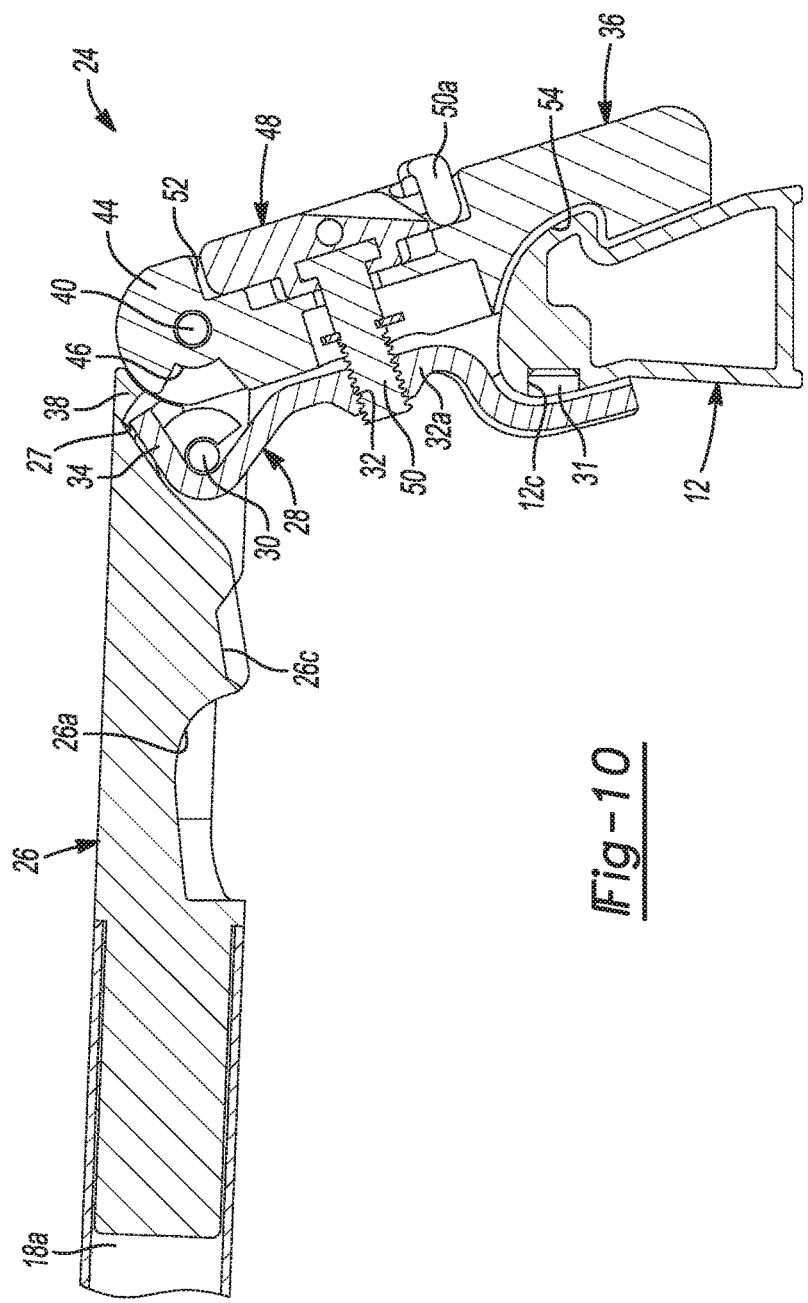
FIG. 10 shows the end support assembly of FIG. 9 with the clamp element fully engaged with the threaded shaft, so that the clamp element and the support element are securely clamped onto the stretch bent rail.

FIG. 10 shows the clamp element 28 and the support element 36 are clamped over the stretch bent rail 12. The threaded shaft 50 of the fastening assembly 48 is engaged with the threaded opening 32 in the clamp element 28 and the boss portions 31 are engaged in a corresponding pair of the holes 12d in the stretch bent rail 12. In this orientation the cross bar assembly 18 is tightly secured at both of its ends to the stretch bent rails 12 and cannot be lifted off or moved slidably along the stretch bent rails 12. The tab portion 34 abuts an inner wall portion 27 (also visible in FIGS. 5B and 6) which further enables tension to be exerted on the clamp element 28 when the fastening assembly 48 is tightened.

The construction of the end support assembly 24 provides a number of important advantages. With further reference to FIG. 10, one of these advantages is that when the support element 36 is rotated into its operative orientation, as shown in FIG. 10, a portion of the head portion 44 abuts the surface 60 of the clevis-like portion 38 of the neck portion 26. This abutting engagement further serves to stiffen the end support assembly 24 once the clamp element 28 and the support element 36 are engaged and clamped on to the stretch bent rail 12.

Another important advantage of the end support assembly 24 design is that the clamp element 28 is held in its fully open (i.e., retracted) orientation, as shown in FIG. 5, when the neck portion 26 and the support element 36 are longitudinally aligned. This is due to the engagement of the tab portion 34 with a surface of the head portion 44 (FIG. 6) of the support element 36. Thus, when the end support assembly 24 is articulated into the position shown in FIG. 5, such as when the user is about to secure it in its stowed position on the brackets 20 of one of the stretch bent rails 12, the clamp element 28 will automatically be held retracted. As such there is no risk that the clamp element 28 will drop down and possibly scratch the roof surface 14 of the vehicle 16. This automatic retracting action is accomplished without the need for any biasing elements such as torsion spring, leaf springs, etc. This significantly simplifies construction of the end support assembly 24 as well.

Figure 11:
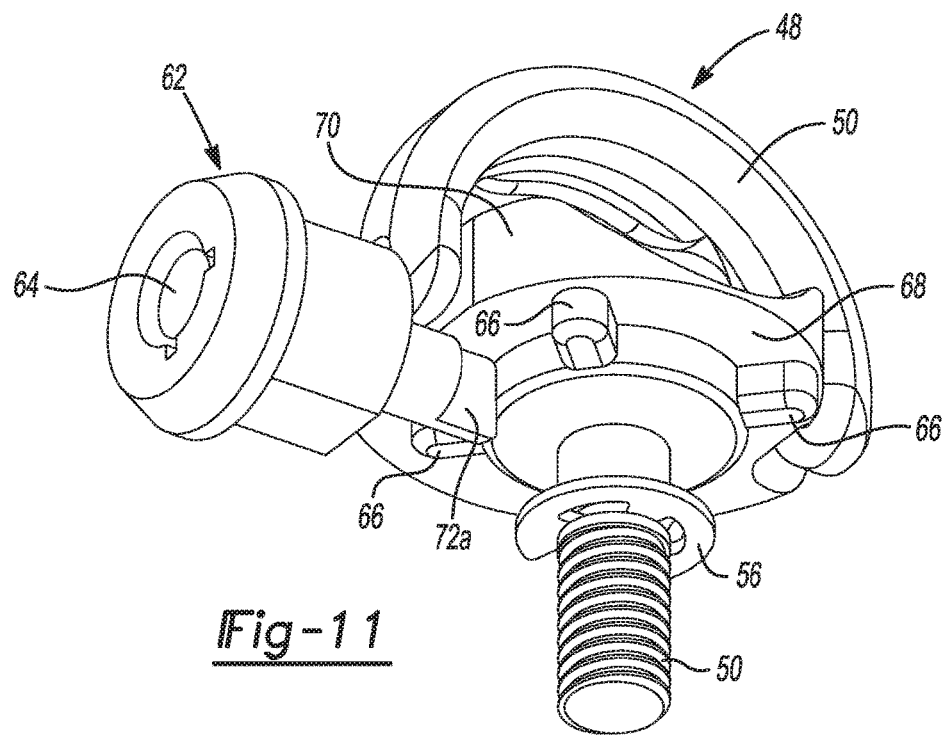
FIG. 11 shows a perspective view of the rotatable fastening assembly and a locking assembly to illustrate the engagement between portions of the locking assembly and the fastening assembly.
Figure 12:
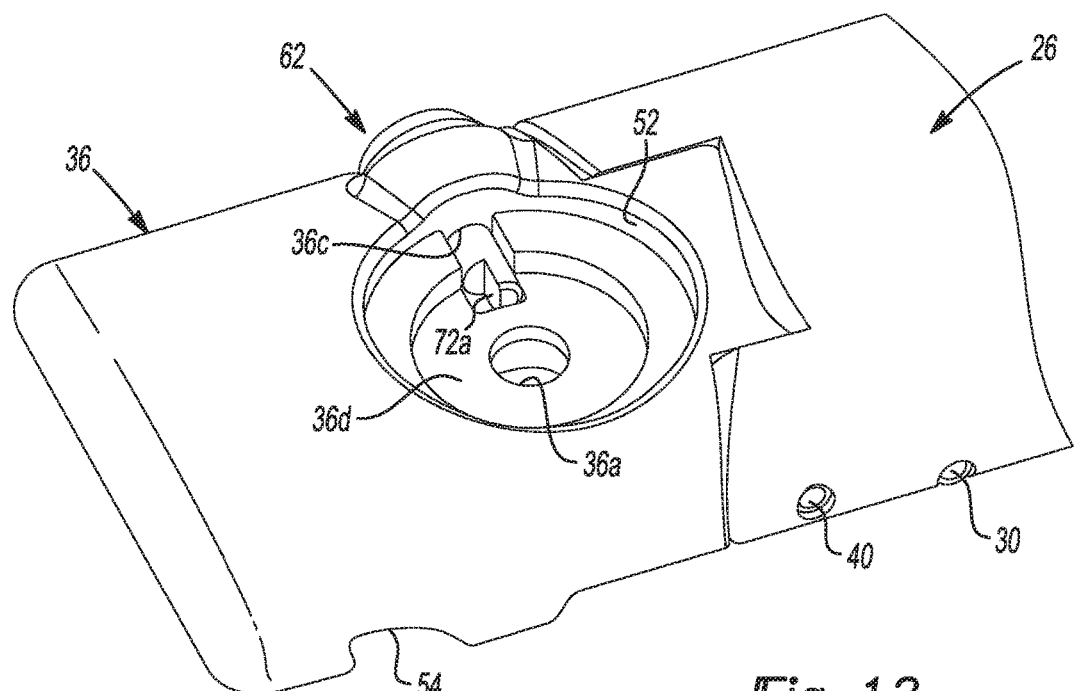
FIG. 12 shows a perspective view of the support element with the fastening assembly removed to better illustrate the recess in the support element and a locking orientation of the locking assembly.
Figure 13:
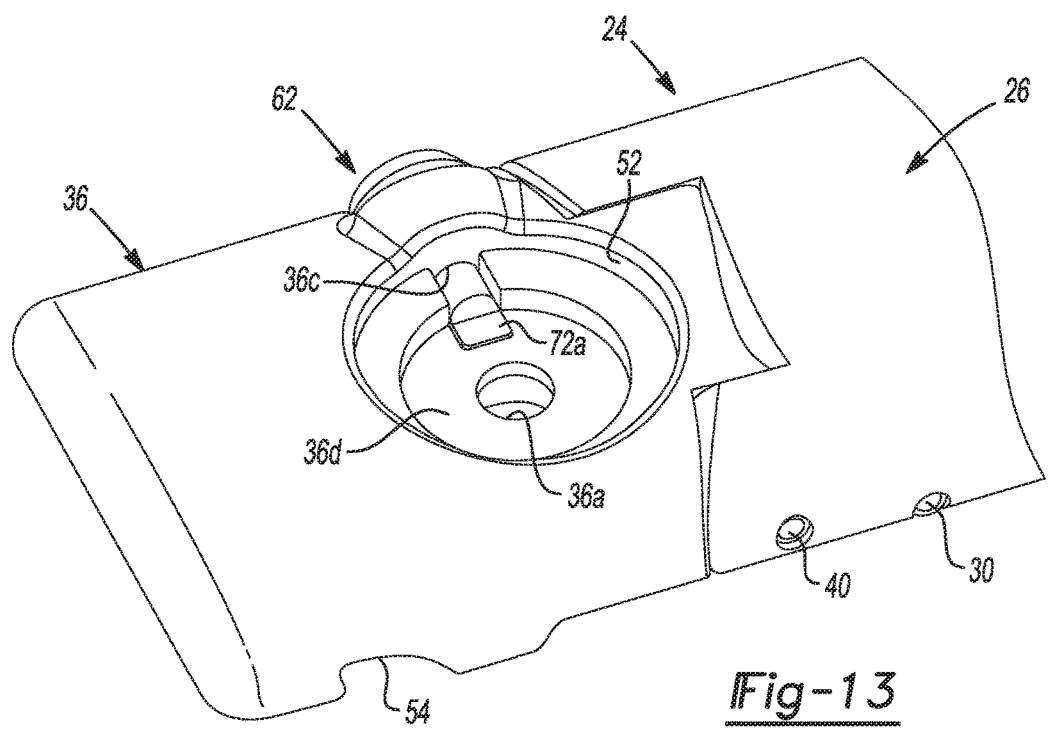
FIG. 13 shows the locking assembly in its unlocked orientation.

Referring to FIGS. 3 and 11-13, in one implementation the system 10 may also include a separate locking assembly 62 integrated into each end support assembly 24. The locking assemblies 62 prevent their associated cross bar assembly 18 from being removed from the stretch bent rails when the cross bar assembly 18 is in either the stowed position or the operative position. Referring specifically to FIG. 11, the locking assembly 62 may include a keyway 64 configured to accept a specific style key which may be supplied with the system 10 when the system is sold, or possibly when a new vehicle incorporating the system 10 is sold. To facilitate a locking action, the locking assembly 48 may include a plurality of protrusions 66 formed on an undersurface 68 of a main body portion 70. The locking assembly 62 may also include a rotatable locking element 72 that is rotated by engaging and rotating the key (not shown) in the keyway 64. As shown in FIGS. 12 and 13, the rotatable locking element 72 may be disposed in a bore 36c of the support element 36, with the bore 36c opening into the recess 52. The bore 36c is also axially aligned with a center of the bore 36a. In FIG. 12 it can be seen that when the rotatable locking element 72 is in a locked orientation, a slotted head portion 72a is oriented to project from a floor surface 36d of the support element 36. When placed in this orientation it will not be possible for the main body portion 70 of the fastening assembly 48 to be rotated, and the fastening assembly 48 will be in a locked condition. But when the rotatable locking element 72 is placed in the orientation shown in FIG. 13, the slotted head portion 72a will be generally flush with the floor surface 36d, which will enable the main body portion 70 of the fastening assembly 48 to be rotated by grasping the D-ring member 50a and turning it.

Figure 15:
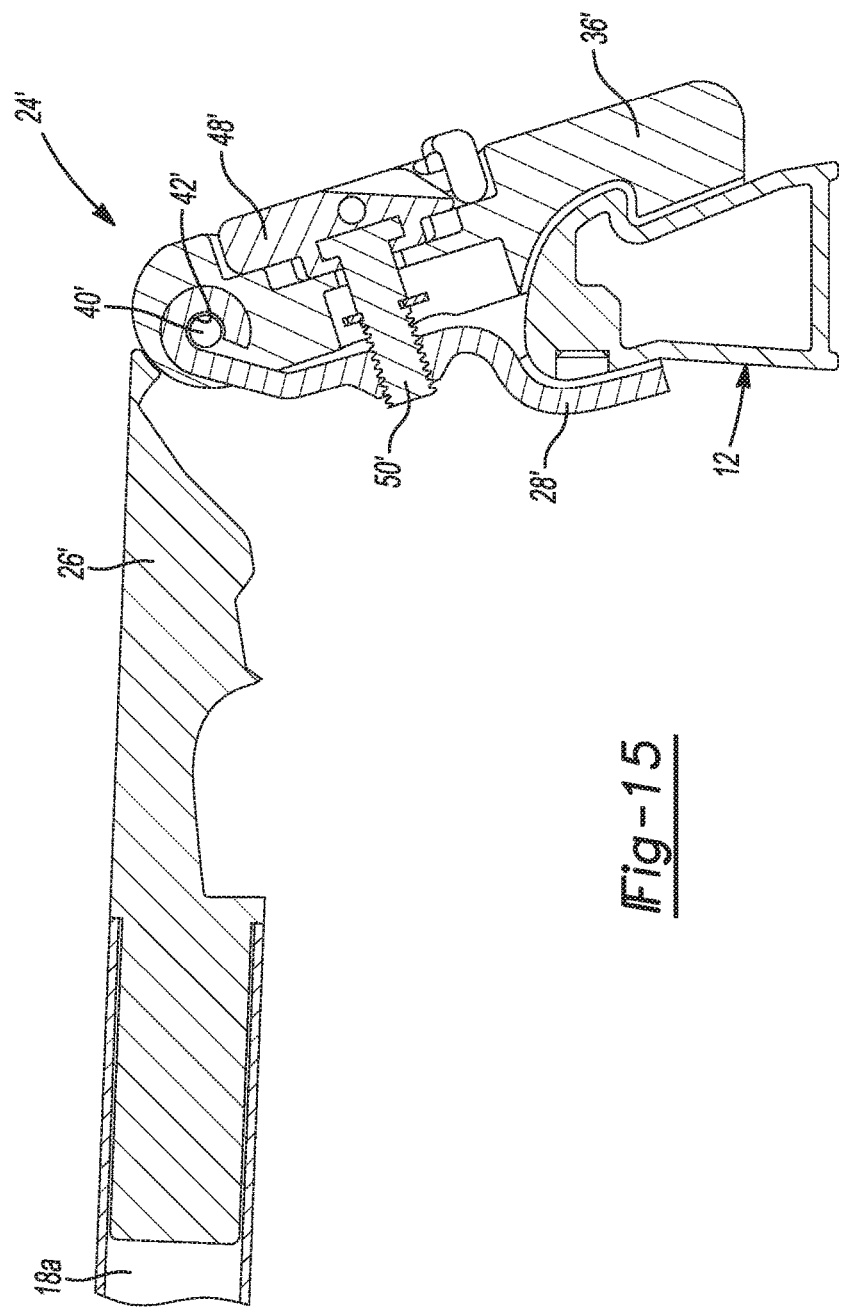
FIG. 15 shows another embodiment of the vehicle article carrier system of the present disclosure that uses only a single pivot point between the support element and the neck portion.

Referring to FIG. 15, an end support assembly 24' in accordance with another embodiment of the present disclosure is shown. The end support assembly 24' differs from end support assembly 24 in that end support assembly 24' only makes use of a single pivot point between a support element 36' and a neck portion 26'. A pivot pin 40' extends through a bore 42' in the support element 36' and supports both a distal end of the neck portion 26' and a distal end of a clamp element 28', to form the single pivot point. Thus, the pivoting motions of the clamp element 28' and the support element 36' occur about the common pivot pin 40'. The end support assembly 24' is otherwise similar to the end support assembly 24 in construction and includes a fastening assembly 48' and a threaded stud 50' forming part of the fastening assembly. Securing of the clamping element 28' using the fastening assembly 48' is performed in the same manner as described above for the end support assembly 24. The single pivot point provided by pivot pin 40 simplifies construction of the end support assembly 24', although the use of a single pivot point does not allow for the forming of a stop or "brace" point by which the support element 36' is braced in its operative position against further rotation, such as with the end support assembly 24' described above.

The system 10 thus forms a means to conveniently store the cross bar assemblies 18 on the low profile stretch bent rails 12 in a manner which does not detract from the aesthetic appearance of the stretch bent rails, and which minimizes any adverse effects on the aerodynamic qualities of the system 10. The cross bar assemblies can be quickly and easily moved between their stowed positions to their operative positions without the need for two individuals to handle the cross bar assemblies, and without the need for any special tools or complicated disassembly or reassembly procedures.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier apparatus for securing articles above an outer body surface of a vehicle, the apparatus comprising:
   a pair of low profile support rails fixedly secured generally parallel to one another on the outer body surface;
   a pair of cross bars configured to be coupled to the support rails in a stowed orientation extending parallel to the support rails, so as to be generally not visible from a side of the vehicle, and an operative orientation extending perpendicularly between the support rails and elevationally above the support rails for supporting articles thereon;
   each said cross bar including a pair of end supports for securing the cross bar to the support rails; each said end support including:
   a neck portion;
   a support element pivotally secured to the neck portion;
   a clamp element pivotally secured to the neck portion for assisting in clamping its associated said end support onto one of the support rails when its associated said cross bar is in the operative orientation;
   the clamp element further being held in a retracted position generally co-linear with the support element when the support element is positioned generally co-linear with the neck portion, and held in a recessed portion of the neck portion, to facilitate attachment of the end support to one of the support rails when being secured in the stowed orientation; and
   a fastening assembly carried by the support element for securing the clamp element in clamping engagement with its associated said support rail when the associated said support rail is in its operative orientation.

2. The apparatus of claim 1, further comprising:
   the clamp element including a tab portion; and
   the support element including a slot; and
   the tab portion being allowed to move into the slot only when the support element is placed in a predetermined angular relationship to the neck portion, to thus permit the clamp element to be used to clamp onto a portion of one of the support rails.

3. The apparatus of claim 1, wherein each said support rail further includes a first pair of holes adjacent a forward first thereof, and a second pair of holes adjacent a second end thereof.

4. The apparatus of claim 3, wherein the clamp includes a pair of boss portions shaped to engage with either the first pair of holes or the second pair of holes of the support rails, to secure its associated said cross bar at a longitudinal position along the lengths of the cross bars.

5. The apparatus of claim 4, wherein the holes in the support rails face each other.

6. The apparatus of claim 1, further comprising first a first pair of brackets associated with a first one of the support rails, and a second pair of brackets associated with a second one of the support rails, the first pair of brackets being used to secure a first one of the cross bars in its stowed position and the second pair of brackets being used to secure a second one of the cross bars in its stowed position.

7. The apparatus of claim 6, wherein each said bracket is disposed inboardly of its associated said support rail.

8. The apparatus of claim 7, wherein:
each one of the brackets includes a threaded opening; and
each said fastening assembly includes a threaded shaft for engaging with one of the threaded openings in one of the brackets when securing its associated said cross bar in the stowed orientation.

9. The apparatus of claim 2, wherein the neck portion, includes a recessed portion for receiving a portion of the clamp element when the cross bar is secured in the stowed orientation.

10. The apparatus of claim 1, wherein:
the clamp element is pivotally coupled at a first end to the neck portion; and
wherein the clamp element includes a tab portion at the first end, the tab portion limiting pivotal movement of the clamping element to a predetermined degree when the support element is resting on one of the support rails and its associated said cross bar is disposed in its operative position.

11. The apparatus of claim 1, wherein the support element includes a recessed portion on an inboard side thereof which is shaped in accordance with a profile of one of the support rails.

12. The apparatus of claim 1, wherein the cross bars, when secured in their stowed positions, are arranged parallel along inboard sides of the support rails and generally not visible from the sides of the vehicle.

13. A vehicle article carrier apparatus for securing articles above an outer body surface of a vehicle, the apparatus comprising:
first and second low profile support rails fixedly secured generally parallel to one another on the outer body surface;
a first pair of brackets disposed adjacent an inboard side of the first support rail at opposite ends of the first support rail;
a second pair of brackets disposed adjacent an inboard side of the second support rail at opposite ends of the second support rail;
a pair of cross bars configured to be coupled to the pairs of brackets when the cross bars are each disposed in a stowed orientation extending parallel to the support rails, so as to be generally not visible from a side of the vehicle, and the cross bars being positionable in an operative orientation extending perpendicularly between the support rails and elevationally above the support rails for supporting articles thereon;
each said cross bar including a pair of end supports for securing the cross bar to the support rails; each said end support including:
a neck portion;
a support element pivotally secured to the neck portion;
a clamp element pivotally secured to the neck portion for assisting in clamping its associated said end support onto one of the support rails when its associated said cross bar is in the operative position;
a fastening assembly carried by the support element for securing the clamp element in clamping engagement with its associated said support rail when the associated said support rail is in its operative orientation;
the support element configurable to extend co-linearly with the support element when its associated said cross is placed in a stowed orientation, and to extend non-parallel to the neck portion when its associated said cross bar is placed in the operative orientation to place the cross bar in an elevated position above the support rails.

14. The apparatus of claim 13, wherein the clamp element is held in a retracted position generally co-linear with the support element when the support element is positioned generally co-linear with the neck portion, and held in a recessed portion of the neck portion, to facilitate attachment of the end support to one of the support rails when being secured in the stowed orientation.

15. The apparatus of claim 13, wherein the support rails each include at least one opening; and
wherein each said clamp includes at least one boss portion for engaging with one of the holes when its associated said support rail is placed in the operative position.

16. The apparatus of claim 13, wherein the neck portion includes a recessed portion, and wherein a portion of the clamp element rests in the recessed portion when the cross bar is in the stowed orientation.

17. The apparatus of claim 13, wherein the support element is pivotally secured to the neck portion about a first pivot axis, and the clamp element is pivotally secured to the neck portion about a second pivot axis different from the first pivot axis.

18. The apparatus of claim 13, wherein the fastening assembly comprises a rotatable component having a threaded shaft, and wherein the clamp element includes a threaded hole which engages with the threaded shaft when the cross bar is clamped to one of the support rails.

19. The apparatus of claim 13, wherein the clamp element is limited in its pivotal movement to a predetermined degree by contact with the neck portion; and
wherein the clamp element is shaped in accordance with a profile of the support rail, and wherein the support element includes a recessed portion shaped in accordance with the profile of the support rail.

20. A vehicle article carrier apparatus for securing articles above an outer body surface of a vehicle, the apparatus comprising:
first and second low profile support rails fixedly secured generally parallel to one another on the outer body surface, each of said support rails including two pairs of holes on inboard sides thereof;
a first pair of brackets disposed adjacent an inboard side of the first support rail at opposite ends of the first support rail;
a second pair of brackets disposed adjacent an inboard side of the second support rail at opposite ends of the second support rail;
a pair of cross bars configured to be coupled to the pairs of brackets when the cross bars are each disposed in a stowed orientation extending parallel to the support rails, so as to be generally not visible from a side of the vehicle, and the cross bars being positionable in an operative orientation extending perpendicularly between the support rails and elevationally above the support rails for supporting articles thereon;
each said cross bar including a pair of end supports for securing the cross bar to the support rails; each said end support including:
a neck portion;
a support element pivotally secured to the neck portion;
a clamp element pivotally secured to the neck portion for assisting in clamping its associated said end support onto one of the support trails when its associated said cross bar is in the operative position, the clamp element having a threaded opening and a boss portion;

a fastening assembly having a threaded shaft and being carried by the support element for securing the clamp element in clamping engagement with its associated said support rail by engagement of the threaded shaft and the threaded opening, when the associated said support rail is in its operative orientation;

the boss portion of the clamping element further engaging with at least one of the holes on one of the support rails when the cross bar is secured in the operative orientation; and the support element configurable to extend co-linearly with the neck portion when its associated said cross bar is placed in a stowed orientation, and to extend non-parallel to the neck portion when its associated said cross bar is placed in the operative orientation to place the cross bar in an elevated position above the support rails.

* * * * *